Oct. 23, 1951  A. J. BEEBIE  2,572,303
IGNITION TESTING DEVICE
Filed Jan. 4, 1950

Abel J. Beebie
INVENTOR.

Oct. 23, 1951     A. J. BEEBIE     2,572,303
IGNITION TESTING DEVICE
Filed Jan. 4, 1950     2 SHEETS—SHEET 2
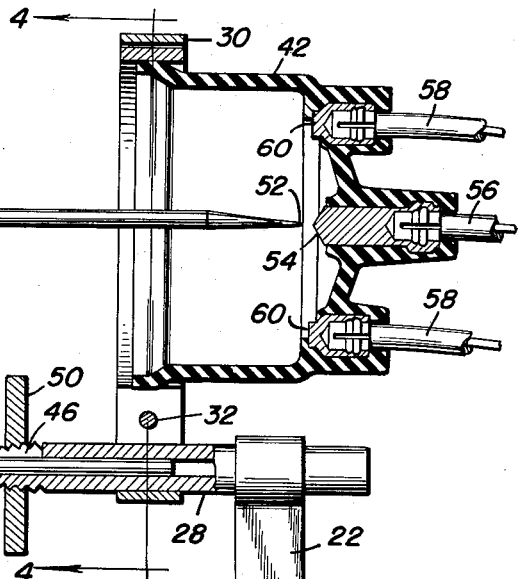
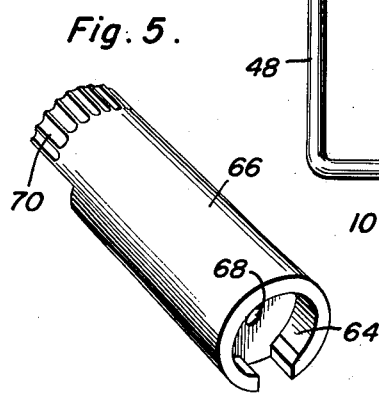
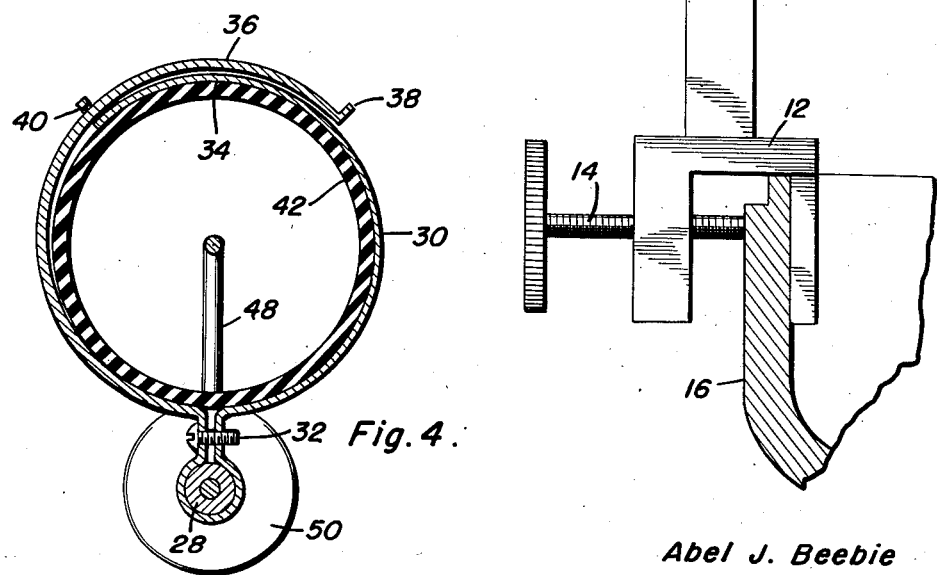
Abel J. Beebie
INVENTOR.
BY *Clarence A. O'Brien*
*and Harvey B. Jackson*
Attorneys

Patented Oct. 23, 1951

2,572,303

UNITED STATES PATENT OFFICE 2,572,303

IGNITION TESTING DEVICE

Abel J. Beebie, Plattsburg, N. Y.

Application January 4, 1950, Serial No. 136,720

3 Claims. (Cl. 175—183)

This invention relates to new and useful improvements and structural refinements in devices for testing the ignition system of internal combustion engines such as automobile engines, etc., and the principal object of the invention is to facilitate convenient and expeditious detection of defects in the ignition system, such as "burned" contact points, short-circuited wiring, cracked distributor caps, and the like.

This object is achieved by the provision of the instant device which includes a bracket which is adapted to be mounted on the housing of a distributor after the usual cap and rotor have been removed from the housing, the invention also including means for supporting the removed distributor cap as well as the rotor for testing purposes.

Some of the advantages of the invention reside in its simplicity of construction, in its efficient and expeditious operation, and in its adaptability for use on distributors of different sizes and types.

With the above more important objects and features in view and such other objects and features as may become apparent as this specification proceeds, the invention consists essentially of the construction and arrangement of parts as shown in the accompanying drawings in which:

Figure 2 is a side elevational view of the invention in use for testing, for example, the ignition contact points;

Figure 4 is a sectional view, taken substantially in the plane of the line 4—4 in Figure 2; and Figure 5 is a perspective view of a rotor mounting member used in the invention.

Like characters of reference are employed to designate like parts in the specification and throughout the several views.

Figure 1:
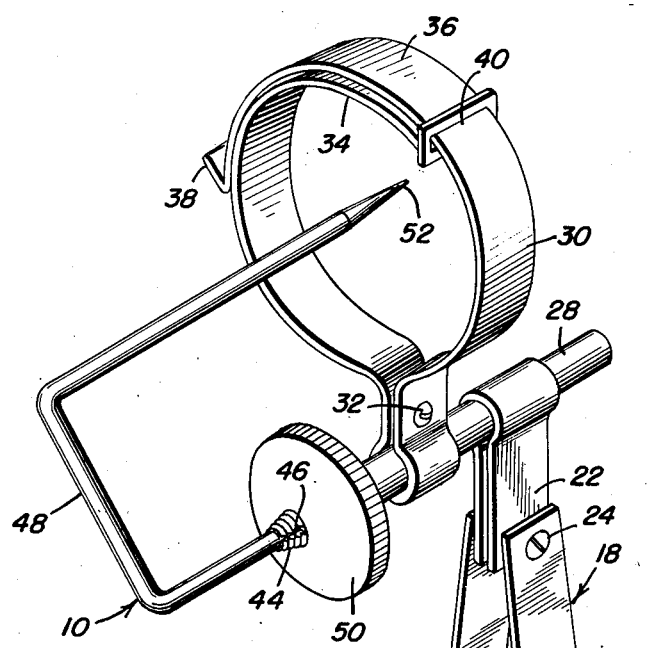
Figure 1 is a perspective view of the invention.

Referring now to the accompanying drawings in detail, the invention consists of an ignition testing device designated generally by the reference character 10, the same embodying in its construction a bifurcated base 12 provided in one furcation thereof with a clamping screw 14 whereby it may be firmly secured to the upper edge portion of a distributor housing 16, as illustrated in the lower portion of Figure 2.

An upwardly extending, adjustable bracket designated generally by the reference character 18 is mounted on the base 12, this bracket consisting of substantially U-shaped lower and upper sections 20, 22 respectively which have free end portions thereof pivotally connected together by a transversely extending screw 24. However, it is to be understood that the sections 20, 22 are sufficiently resilient to frictionally engage each other on the screw 24 and thereby prevent their excessively free relative rotation.

The "bight" portion of the section 20 is rotatably attached by a screw 26 to the base 12, while the bight portion of the section 22 has secured therein a tubular holder 28.

A resilient, substantially annular clamping band 30, configurated such as best shown in Figures 1 and 4, is clamped by a screw 32 on an intermediate portion of the holder 28 and has slidably overlapped free end portions 34, 36. The terminal end of the band portion 36 is outturned to provide a finger piece 38, while the terminal end of the band portion 34 is also outturned and is provided with a slot 40 to slidably receive the band portion 36, whereby the clamping band may be readily expanded or contracted into frictional engagement with the lower edge portion of the usual cap 42 which has been removed from the distributor body 16.

It will be apparent from the foregoing by virtue of the adjustability of the bracket sections 20, 22 with respect to each other and by virtue of the rotatability of the entire bracket on the base 12, the device may be adjusted so that the cap 42 is supported in an easily accessible position.

One end portion of the aforementioned holder 28 is tapered, externally screw threaded as at 44 and provided with a plurality of longitudinal slots 46 so as to provide frictional gripping means for retaining one end portion of a substantially U-shaped electrode 48 in the holder. A nut 50 is provided on the screw threaded, tapered portion 44 of the holder for tightening or loosening the gripping means, it being noted that the free outer end portion of the electrode 48 extends through the clamping band 30 into the cap 42 and terminates in a pointed extremity 52.

When the invention is placed in use as shown in Figure 2 for testing the ignition contact points, condenser or coil, the pointed extremity 52 of the electrode 48 is spaced at a predetermined distance from the center terminal 54 in the distributor cap to which is connected the cable 56 leading from one end of the secondary winding of the coil (not shown) the remaining end of which winding is, of course, grounded, as is the entire device 10 by being clamped to the metallic housing 16 of the distributor.

Thereupon the contact points in the distributor may be manually opened so as to produce a spark between the terminal 54 and the pointed extremity 52 of the electrode 48, and it will be found that by simply observing the characteristics of this spark, the condition of the contact points, coil and condenser may be determined.

Figure 3:
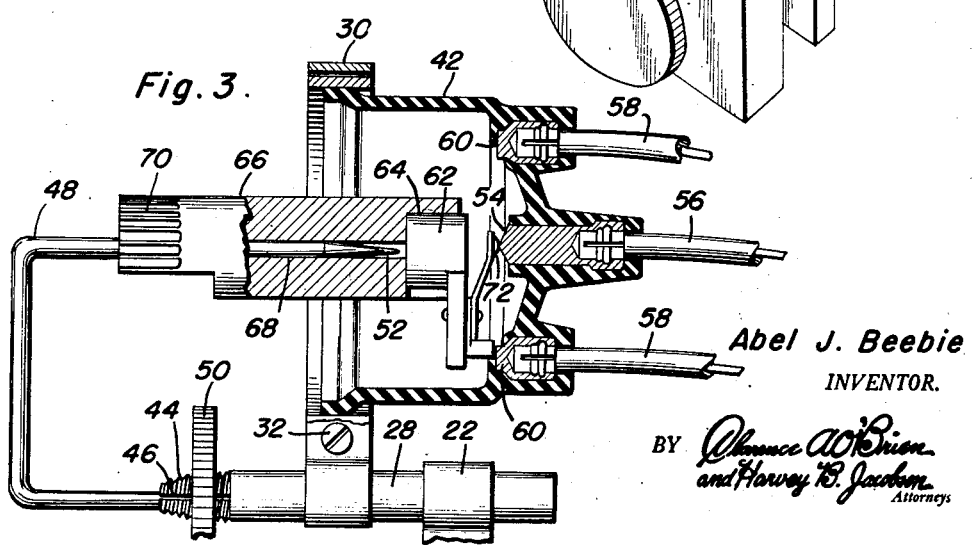
Figure 3 is a fragmentary elevational view of the invention, similar to that shown in Figure 2, but illustrating the device in use for testing, for example, the "high tension" wiring.

When it is desired to test the distributor cap 42 and the condition of the spark plug wires 58 connected to the cap terminals 60, the distributor rotor 62 is simply placed in a recess 64 provided in one end portion of a substantially tubular mounting member 66, the latter being provided with a longitudinal bore 68 so that it may be removably and rotatably positioned on the electrode 48 as shown in Figure 3.

To facilitate rotation thereof, the mounting member 66 may be equipped with a knurled finger piece 70, and it will be found that by engaging the contact element 72 of the rotor 62 with the terminal 54 and rotating the member 66 while alternately closing and opening the contact points of the distributor, presence of sparks at points other than between the rotor 62 and the terminals 60 will indicate points in the cap at ground potential with the clamp band 30.

Similarly, by adjusting the rotor 62 so that it is adjacent one of the terminals 60 and opening the contact points, the absence of a spark between that terminal and the rotor will indicate an open circuit in the associated wire 58.

Needless to say, various different techniques may be devised for testing purposes, based on observation of different characteristics and employing either a direct deduction or a process of elimination for diagnosis of a particular fault.

It is to be also noted that in addition to its primary use for testing purposes the invention may also be employed when setting the timing of the associated engine by simply rotating the engine crankshaft to the firing position of a piston and observing the presence of a spark between the electrode point 52 and the terminal 54 to determine the exact moment of separation of the contact points relative to the piston position.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

1. In an ignition testing device, the combination of a bifurcated base provided in one furcation thereof with a clamping screw for securing the same to a cap-less distributor housing, an adjustable bracket provided on and extending upwardly from said base, a tubular holder mounted on said bracket and having frictional gripping means at one end thereof, a resilient annular clamp provided on said holder to receive a distributor cap, and a substantially U-shaped electrode having one end portion thereof adjustably positioned in said holder and locked therein by said gripping means, the other end portion of said electrode extending through said clamp.

2. The device as defined in claim 1 wherein said bracket comprises a pair of substantially U-shaped sections having end portions thereof pivotally connected together, said holder being secured to one of said sections and the remaining section being rotatably attached to said base.

3. The device as defined in claim 1 together with a substantially tubular mounting member removably and rotatably positioned on said electrode and provided in one end thereof with a rotor receiving recess.

ABEL J. BEEBIE.

REFERENCES CITED

The following references are of record in the file of this patent:

UNITED STATES PATENTS

| Number | Name | Date |
|---|---|---|
| 2,305,018 | MacGillivray | Dec. 15, 1942 |